United States Patent Office 3,329,241
Patented July 4, 1967

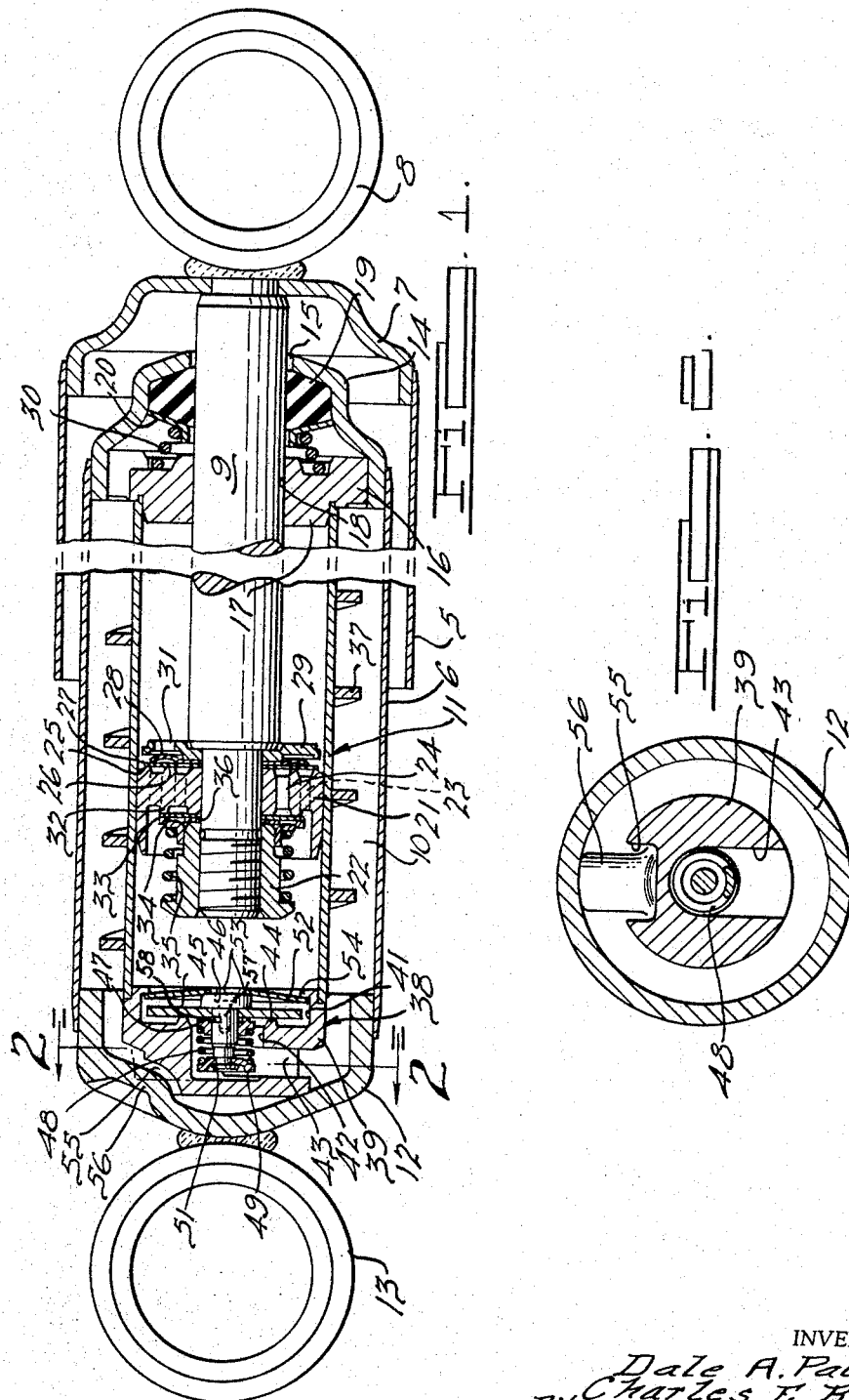

3,329,241
SHOCK ABSORBER HEAD CONSTRUCTION
Dale A. Palmer, Charles E. Read, and Thurman R. Sanders, all of Monroe, Mich., assignors to Monroe Auto Equipment Company, Monroe, Mich., a corporation of Michigan
Filed Apr. 22, 1965, Ser. No. 450,032
4 Claims. (Cl. 188—100)

This invention relates to hydraulic, direct-acting shock absorbers, and particularly to a shock absorber which can function both in a vertical and a horizontal position.

Shock absorbers for automotive vehicles and the like have heretofore been constructed to function in a vertical plane or in angular positions relative thereto. Since the piston rod is located on only one side of the piston, a reservoir is provided for excess fluid which contains air at the upper end to permit fluid to move inwardly and outwardly of the reservoir. If such a shock absorber were placed horizontally, the air could be drawn into the cylinder and because of the compressibility thereof would render the shock absorber inoperative.

The present invention relates to a shock absorber which has the passageway for the fluid from the reservoir to the cylinder located at one side thereof, which would be the bottom side when the shock absorber is disposed in a horizontal position. With this arrangement the shock absorber will function properly not only in the horizontal position, but also in the vertical position and in all positions therebetween.

Accordingly the main objects of the invention are: to provide a shock absorber which will function in the horizontal and vertical positions and in all positions therebetween; to provide a shock absorber with a passageway from the reservoir to the pressure cylinder located on one side thereof which will be the bottom side when the shock absorber is placed in a horizontal position; to provide a shock absorber having a passageway on the bottom side thereof between the reservoir and the pressure cylinder with means for indicating the location of the top side thereof, and in general to provide a shock absorber which functions in all positions which is simple in construction, positive in operation and economical of manufacture.

Other objects and features of novelty of the invention will be specifically pointed out or will become apparent when referring, for a better understanding of the invention, to the following description taken in conjunction with the accompanying drawing, wherein:

FIGURE 1 is a broken sectional view of a shock absorber embodying features of the present invention, and FIGURE 2 is a sectional view of the shock absorber illustrated in FIG. 1, taken on the line 2—2 thereof.

The shock absorber herein illustrated is of the standard type except for the location of the passageway which permits the shock absorber to function properly when disposed in a horizontal plane. In the drawing, the shock absorber includes telescoping tubular sections 5 and 6 which are movable longitudinally with respect to each other when the shock absorber is attached between the sprung and unsprung portions of a vehicle, or the like. The tubular section 5 has an end cap 7 secured to the upper end thereof. The end cap is adapted to be connected to the spring portion of a vehicle by means of a ring-like attaching element 8. A piston rod 9 has its upper end rigidly connected to the underside of the central portion of said cap 7 and depends therefrom into the section 6. The section 6 is concentric with the section 5 which extends over the upper part thereof. A pressure cylinder 11 is spaced from and is concentric to the cylinder section 6, the space therebetween forming a reservoir 10. The lower end of the tubular section 6 is closed by a cap 12 which is adapted to be connected to the unsprung portion of a vehicle by any suitable means, such as by a ring-like attaching member 13. The upper end of the tubular section 6 is closed by a cap 14 which is provided with a central aperture 15 through which the piston rod 9 extends.

The upper end of the pressure cylinder 11 is closed by a piston rod guide member 16 having a reduced portion 17 which extends within the pressure cylinder 11. The guide member 16 has a central aperture 18 which snugly fits the piston rod 9 which operates therethrough. A rubber seal 19 surrounds the piston rod 9 and is confined within the upper portion of the end cap 14 by a retainer element 20 and a spring 30. A piston 21 is mounted on the lower shoulder end of the piston rod 9 secured thereon by a nut 22. The piston 21 has an outer set of apertures 23 annularly disposed and an inner set of annularly disposed apertures 24 extending therethrough. Annular valve seats 25 and 26 are provided on the top of the piston 21 engaged by a thin washer-like valve 27 for closing the passageways 23 when the piston 21 is moved upwardly. A spring disc 28 urges the washer valve 27 upon the annular seats 25 and 26. A washer 29 having a plurality of apertures 31 therethrough is disposed above the piston 21.

An annular valve seat 32 is provided on the bottom of the piston 21 outwardly of the inner row of apertures 24 engaged by a washer-like valve 33 when urged thereagainst by a sleeve 34 which is slidable on the nut 23 and urged upwardly by a spring 35 carried by the nut. A washer 36 is engaged by the end of the nut 23 and clamps the valve 33, the piston 21, the valve 27, the spring disc 28 and the washer 29 against the shoulder of the piston rod 9. When the piston is moved upwardly by the piston rod 9, fluid passes through the apertures 31 and around the washer 29 and through the apertures 24. The pressure of the fluid moves the washer-like valve 33 and sleeve 34 against the pressure of the spring 35 to permit the passage of the fluid from the upper part of the cylinder 11 through the valve 21 to the lower part thereof. A helical baffle 37 is secured to the outer surface of the pressure cylinder 11 within the reservoir 10 for reducing the turbulence of the oil or other fluid as it moves into and out of the reservoir.

The lower end of the pressure cylinder 11 has a valve assembly 38 which embodies a head 39 having a portion extending within the pressure cylinder 11 in secured relation thereto. The head 39 has an enlarged recess 41 connected to an aperture 42 which communicates with a passageway 43. A valve seat 44 is provided about the passageway 42 which is engaged by a valve plate 45. A rivet 4 extends through the central aperture in the valve plate 4 and guides a sleeve 47 thereon which is urged upwardl by a spring 48 which has the lower end resting upon washer 49 which is secured at the end of the rivet 4 by a flanged over end 51. A spring disc 52 has fingers 5 thereon in engagement with the head of the rivet 46 an is secured in the recess 41 by an inwardly coined flang 54. The rivet has a central passageway 57 communicatir with a slot 58 through which oil or other fluid is co: ducted to the interior of the sleeve 47. The head 38 h: a recessed portion 55 which receives the embossed se tion 56 of the cap 12 and locates the head relative theret This locates the passageway 43 opposite to the enclos section 56 so that when employed in horizontal positio care must be taken that the embossed section 56 is at t top, thus locating the passageway 43 at the bottom so th the air in the reservoir above the oil or other fluid cann enter the passageway 43 which could occur if the passa; way were located at the top of the shock absorber wh disposed in horizontal position.

When a stud is employed in place of the ring 13, sometimes occur for certain assemblies, then further as rance must be had that the embossed portion 56 is loca at the top in assembly. The word "top" or other connotation may be stamped, painted or otherwise placed upon the sleeve section 6 to provide further assurance that the shock absorber will be mounted properly when in horizontal position.

In operation, when the sprung and unsprung portions of the vehicle move toward each other, the piston rod 9 moves downwardly and dampens the movement by the passage of the oil through the outer apertures 23. Since the piston rod reduces the area of the cylinder above the piston, any excess pressure generated therebelow will force the oil or other fluid through the passageway 57 and slot 58 to unseat the sleeve 47 and permit the fluid to pass into the reservoir 10. When the distance between the sprung and unsprung portions of the vehicle increases, the piston rod 9 moves upwardly and oil or other fluid moves downwardly through the inner row of apertures 24 of the piston 21, unseating the washer-like valve 33 as well as the valve plate 45 to draw excess oil or other fluid from the reservoir 10. Since this fluid must be drawn through the passageway 43 at the bottom of the shock absorber when in horizontal position, there is no danger of any air which is present above the fluid in the reservoir from being drawn into the pressure cylinder. The valve seats 32 and 44 have spaced notches coined therein of very shallow depth to permit the bleeding of the oil or other fluid past the valves which is desirable during times of minimum movements of the piston within the pressure cylinder.

What is claimed is:

1. In a shock absorber, a cylinder, a piston in said cylinder, a reservoir, a head on the end of the cylinder containing a valve for controlling the flow of fluid to and from the reservoir and cylinder, said head having a lateral passageway therethrough from said cylinder through said valve to said reservoir located at one side of the center line of the cylinder and adjacent to the bottom side of the shock absorber when employed in a horizontal position, said head having a recess therein and the wall of said reservoir being deflected into said recess for locating the head and passageway relative thereto.

2. In a shock absorber, an outer cylindrical casing having caps on the ends thereof, one cap having an aperture therethrough, a piston rod extending through said aperture, a cylinder, a head secured to said cylinder having an aperture through which the piston rod extends, a piston within the cylinder on said rod having passageways for controlling the flow of fluid therethrough in either direction of movement of said piston, a head on the opposite end of the cylinder containing a valve for controlling the flow of fluid from the cylinder into the reservoir space between the cylinder wall and casing wall, said head being closed on the bottom and having a lateral passageway located on one side of the piston rod for directing the passage of fluid through the valve to and from the reservoir at the bottom of the shock absorber when operating in horizontal position, the adjacent cap being deflected inwardly into a notch in the head which is located diametrically opposite to the passageway therein which, when disposed upwardly, indicates that the passageway in the head is located downwardly.

3. In a shock absorber, an outer cylindrical casing having caps on the ends thereof, one cap having an aperture therethrough, a piston rod extending through said aperture, a cylinder, a head secured to said cylinder having an aperture through which the piston rod extends, a piston within the cylinder on said rod having passageways for controlling the flow of fluid therethrough in either direction of movement of said piston, a head on the opposite end of the cylinder containing a valve for controlling the flow of fluid from the cylinder into the reservoir space between the cylinder wall and casing wall, said head being closed on the bottom and having a lateral passageway located on one side of the piston rod for directing the passage of fluid through the valve to and from the reservoir at the bottom of the shock absorber when operating in horizontal position, said head having a recess disposed diametrically opposite to the passageway therein and said cap containing a depression extending into the recess of the head to provide visual indication of the location of the passageway from the exterior of the shock absorber.

4. In a shock absorber, an outer cylindrical casing having caps on the ends thereof, one cap having an aperture therethrough, a piston rod extending through said aperture, a cylinder, a head secured to said cylinder having an aperture through which the piston rod extends, a piston within the cylinder on said rod having passageways for controlling the flow of fluid therethrough in either direction of movement of said piston, a head on the opposite end of the cylinder containing a valve for controlling the flow of fluid from the cylinder into the reservoir space between the cylinder wall and casing wall, said head being closed on the bottom and having a lateral passageway located on one side of the piston rod for directing the passage of fluid through the valve to and from the reservoir at the bottom of the shock absorber when operating in horizontal position, said head containing the valve having a recess diametrically disposed to the passageway therein and said cap having a depression extending into said recess providing visual location for the passageway on the diametrical opposite side from said depression.

References Cited
UNITED STATES PATENTS 2,897,923   8/1959   Agar.
3,020,981   2/1962   Day.

MILTON BUCHLER, Primary Examiner.

FERGUS S. MIDDLETON, Examiner.

G. E. HALVOSA, Assistant Examiner.